United States Patent [19]

Timmis

[11] 4,283,861
[45] Aug. 18, 1981

[54] PLOTTING DEVICE

[76] Inventor: William W. Timmis, 85 Gibson Rd., Bristol, R.I. 02809

[21] Appl. No.: 94,884

[22] Filed: Nov. 16, 1979

[51] Int. Cl.³ .............................................. B43L 13/02
[52] U.S. Cl. ...................................... 33/449; 33/494; 33/457
[58] Field of Search ................. 33/448, 449, 431, 457, 33/1 SB, 1 SD, 494; 235/61 NV, 61 GE

[56] References Cited

U.S. PATENT DOCUMENTS

| 713,097 | 11/1902 | Heydrick | 33/494 X |
| 2,360,911 | 10/1944 | Tress et al. | 33/449 |

FOREIGN PATENT DOCUMENTS

| 516720 | 12/1920 | France | 33/494 |
| 739955 | 11/1932 | France | 33/448 |
| 352755 | 7/1931 | United Kingdom | 33/449 |
| 599260 | 3/1948 | United Kingdom | 33/457 |

Primary Examiner—Harry N. Haroian
Attorney, Agent, or Firm—Barlow & Barlow

[57] ABSTRACT

A plotting device for use on a nautical or air chart for course finding in which there is a body portion which has graduations which are in scale with the chart with which the device will be used. There will also be a straight edge on this device and a roller with its axis parallel to the straight edge as a means for rolling the straight edge from a desired course position to a compass rose on the chart for determining the direction of the course. Upon this roller there will also be an indication of the speed of the boat or plane which is to be plotted and from that speed designation will be indications cooperating with the graduations on the body to determine the time which it will take for a boat or a plane moving at the selected speed to travel certain distances along the body of the device as shown by the graduations. The device will also have means to calculate angles of current or wind that may affect the direct line of course from one point to another and which may be used in connection with the body of the device to plot the proper angle of course to compensate for the current or wind in a direction at something of an angle to the desired course.

7 Claims, 7 Drawing Figures

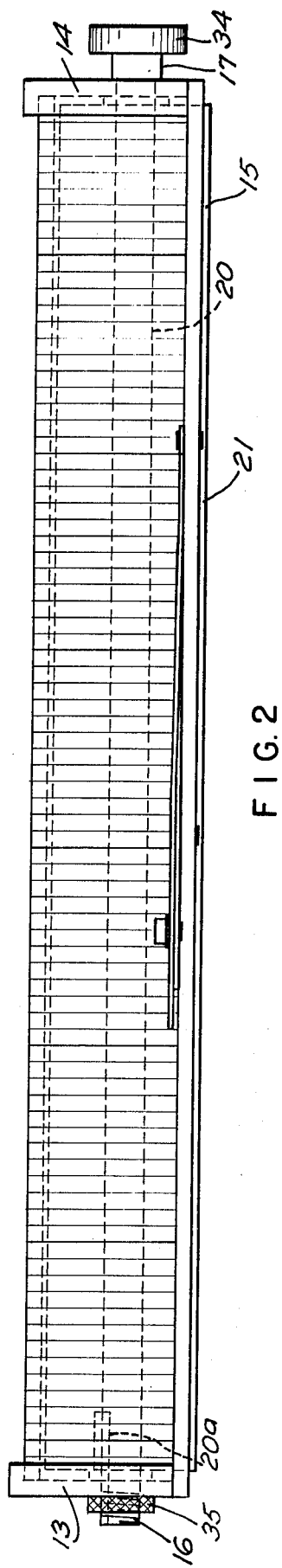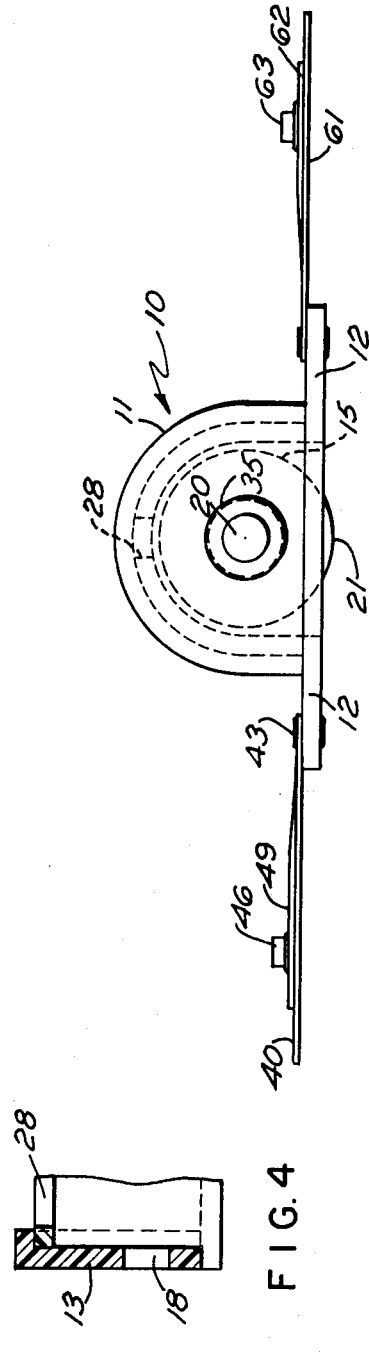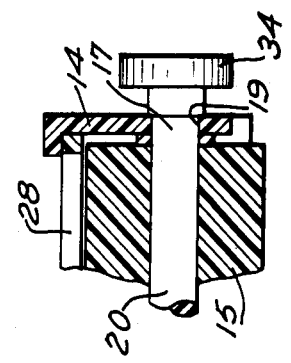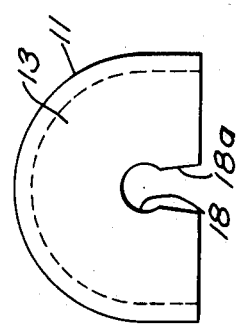

PLOTTING DEVICE

BACKGROUND OF THE INVENTION

Heretofore plotting devices have been constructed which may have some sort of a portion of a circle or rose on them to be set in conjunction with the rose on the chart with which they are to be used or there may be a roller to move some sort of a straight edge from one position to another and sometimes there may be variations in plotting different courses as shown in U.S. Pat. No. 3,353,274.

SUMMARY OF THE INVENTION

The body of the device is formed with a straight edge from which there extends graduations which correspond in a dimension to the distance dimensions on the chart with which the device will be used, and spaced from this straight edge there is an arcuate portion which houses a roll with its axis parallel to the straight edge. This roll may be used to roll the body from the course line between points to the compass rose to determine the course to which the straight edge has been applied so that the course from one point to another may be known. This roll in addition to serving as a device for moving the straight edge from one position to another also has on it a speed designation and along a line from this speed designation parallel to the axis of the roll there are provided time indications which are laid out to cooperate with the graduations on the body so that the time for a boat or plane to move from one position on the chart to another may be determined by the showing of these markings on the roll. For other speeds the roll may be turned to exhibit other speed conditions and other times to cooperate according to the speed which is designated. It is convenient to provide a window along the arcuate portion of the body in which the roll is mounted so that these speed and time indications will be exhibited through the window, or, they may be viewed through the transparent portion of the arcuate portion of the body. The arcuate portion of the body is intermediate to flanges that extend away from either side of the arcuate portion and terminate as opposite parallel straight edges. On these flanges there are mounted a current arm and a course arm so that influences of a current at an angle to the course desired from one point to another may be plotted with reference to the straight edge and the device used in such a way that compensation for current is readily plotted and calculated.

DESCRIPTION OF THE DRAWINGS

FIG. 2 is a side elevation of the device;
FIG. 3 is an end view of the device;
FIG. 3A is an end view of a modified end wall;
FIG. 4 is a section of one cap end of the device;
FIG. 5 is a section through the other cap end of the device showing a portion of the roll;
FIG. 6 is a schematic showing for plotting.

DESCRIPTION OF THE PREFERRED EMBODIMENT

Figure 1:
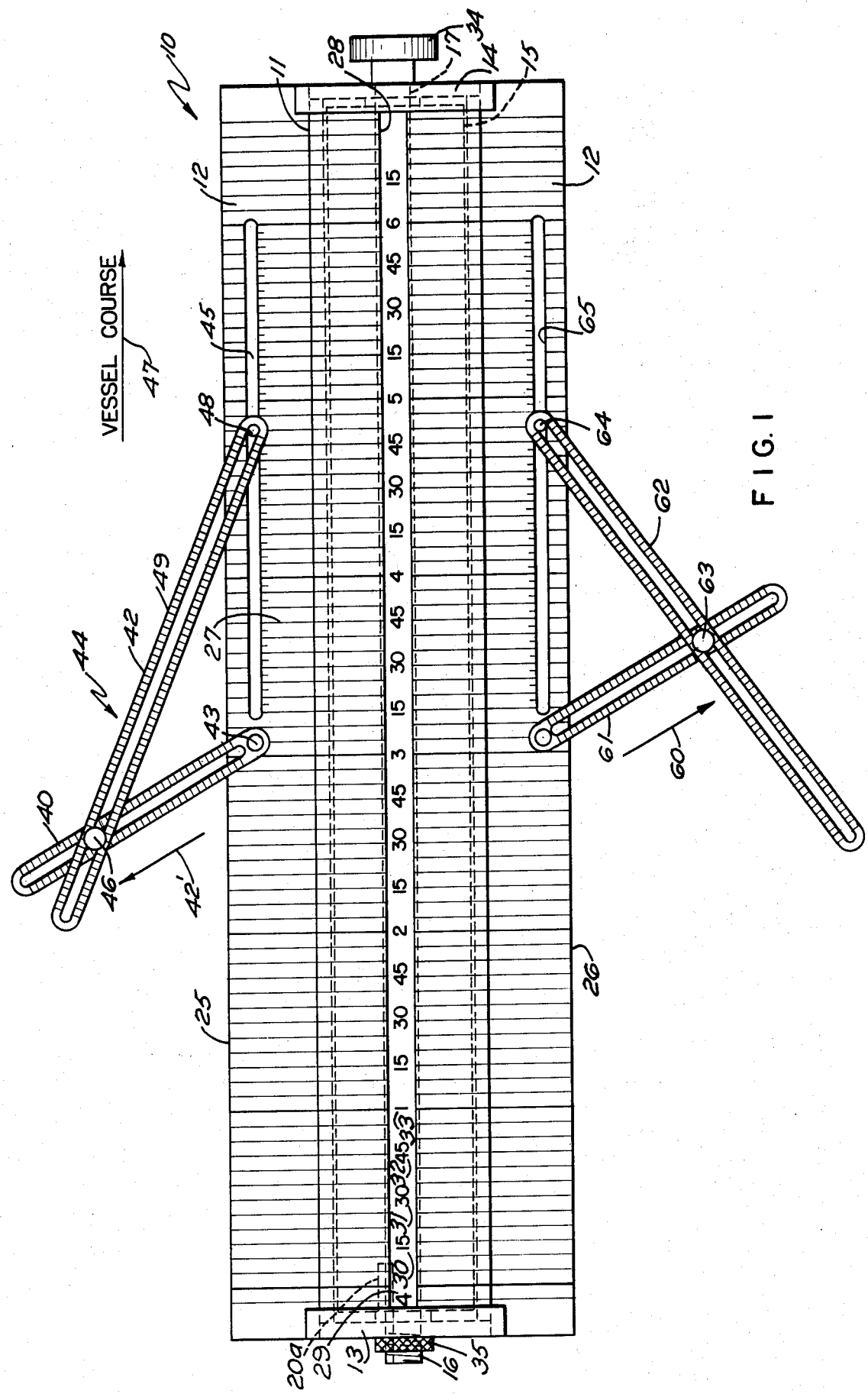
FIG. 1 is a top plan view of the device.

With reference to the drawings, 10 designates the body of the device which will preferably be of plastic having an arcuate portion 11 with flanges 12 at either side thereof (FIG. 3). This arcuate portion 11 has end walls 13 and 14 at either end thereof, which end walls support or mount a roll 15. A shaft 20 extends through the roll, is keyed thereto as at 20a (FIG. 1) and protrudes outwardly beyond the ends thereof to provide trunnions 16 and 17 that extend into bearings 18 and 19 in the end walls 13, 14. As will be appreciated, trunnions may extend integrally from the ends of the roll and an end cap with a keyhole slot, such as 18a (see FIG. 3A) may be used. The roll 15 is of a diameter so that a lower portion thereof as at 21 (FIG. 3) extends below the body, preferably on the order of 9.5 mm, so that the entire device may be rolled along a flat surface for movement of the body in which it is mounted to a location such as a compass rose on a chart.

The flanges 12 provide straight edges 25 and 26 and distance graduations 27 extend from one straight edge 25 to the other straight edge 26 being interrupted at the window 28 extending lengthwise of the arcuate portion. The distance graduations will be used as visual reference lines to accurately determine the time required to travel from one point to another point, as shown on a chart, and as indicated on the speed time scales displayed on the roll.

On the surface of the roll 15 there are indicia marks such as at 29 (FIG. 1) to indicate a certain speed at which the vessel or plane is traveling and extending from such speed indication there are marks 30, 31, 32, 33, and so forth, also in a straight line parallel to the axis of the roll which will indicate the time that it will take for a vessel traveling at the speed indicated at 29 to move the distance between one or more of the graduations such as 27. Thus there is shown in quarter hours or fifteen minute intervals the time at 30, 31, 32 and 33 which it will take for the vessel to traverse, at the speed of four knots, for the distance shown by the spacings or graduations 27. Many speeds may be inscribed on the roll with time intervals extending therefrom any one of which may be selected for exposure thru slot 28 by using knob 34 to rotate roll 15.

It will be necessary to change the roll 15 as the scale on the chart in use changes since there will be rolls available with markings appropriate for each chart scale. In this case the knob 34 may be removed, the shaft 20 withdrawn to allow the roll fall out and another roll substituted and then the knob 34 replaced. A locking nut 35 may be provided as on trunnion 16, to hold the roll 15 at a predetermined speed over the bottom value. In the modified form as seen in FIG. 3A the trunnions may be snapped out of the keyhole slot 18a in an end cap.

Nautical charts are usually laid out on a Mercator's scale of 1 to 10,000, 20,000, 40,000, 80,000 or 100,000. One most commonly used is 1 to 80,000 and for illustrative purposes the spacings between the graduations 27 will therefore be in accordance with the latitude spacings on the 1 to 80,000 chart. However, as these chart scales are multiples, then it is easy to calculate from one chart to another or it could be that certain of the lines that correspond with one spacing could be made of one color and those corresponding to another spacing could be made of another color for use on different scale charts.

In the event that there is a current or wind vector running at an angle to the intended course to be laid out, then this must be taken into account and to do so, there is shown in FIG. 1 an arm designated 40, which I term as a current arm, and assuming that there is a current in the direction of arrow 42' at an angle to straight edge 25, then this arm which is pivoted as at 43 will be swung to a line parallel to the current 42'. Should this current be 2.5 knots, then the corrected heading arm 44 which is slidable along a slot 45 parallel to the straight edge 25 will be moved so that its pivot of connection 46 to the current arm may be moved to the location of the 2.5 designated on the current arm. At the same time the vessel's speed through the water which is designated on the corrected heading arm will be located at the pivot of connection 46 by means of its sliding connection 48 therewith. With the speed of the vessel through the water located at the pivot of connection 46, there will be an angle made with the straight edge 25 and the crossing points of arms 44 and 40 will be clamped in place by a thumb screw 46, thus showing a course along the edge 49 of the course arm 44. The current 42' has an unfavorable increment to the speed of the vessel as indicated at 47 and therefore along the slot 45 will be read the speed of the vessel as reduced by the increment of the current 42' and will be noted. In order to make use of this angle, the edge 42 of this corrected heading arm 44 will be used as a straight edge to strike a line such as 65 (FIG. 6) on the chart representing the direction to steer in order to make good the course established by straight edge 25. Using this new line as the reference re-align straight edge 25 on this new line and roll the entire device to the compass rose and when straight edge 25 is on the compass rose center point, read the corrected magnetic heading required to make the original course good from A to B. As to the timing of this, the straight edge 25 will be moved back to the line between the points A and B and the roll 15 rotated until the speed such as shown at 29 corresponds to the speed over the bottom as shown on the scale located along slot 45. This will be used to calculate the time it will take to move from point A to point B. This will be accomplished by placing the straight edge 25 along the line from A to B setting the roll so that the speed 29 will now correspond to the speed over the bottom and then reading off from the straight edge the distance between points A and B and following down the line which indicates the time that it will take at this new speed to move from point A to point B.

In case the current should have been in the opposite direction as indicated by the arrow 60, then the arm on the other side of the device which is indicated as 61 as the current arm will be swung to be parallel to the arrow 60 or current 60 and the course arm 62 will be set by thumb screw 63 along the marks on current arm 61 which indicate the current set. The corrected heading arm 62 will be moved so that the vessel speed thru the water as designated on the corrected heading arm will be located at the pivot of connection 63. The steering direction will be shown by straight edge 62. Using the line such as 50 established by straight edge 62, roll the entire device to the compass rose and read the magnetic heading to be steered. Also by noting the speed over the bottom as shown by the scale adjacent slot 62, set the speed index on the roll at this value and then the time taken from the indications 30, 31, 32 which will indicate a shorter time than would be had there been no current increment with the course.

I claim:

1. A plotting device comprising an elongated body with a straight edge and an arcuate portion extending lengthwise thereof, a window in said arcuate portion extending lengthwise of said arcuate portion, graduations of distance extending away from said straight edge to said window and comparable with the distance on the chart with which the device is intended to be used, a roll mounted in said arcuate portion with its axis parallel to said straight edge, said roll extending below said body to enable said body to be rolled at right angles to said straight edge along a generally flat surface, said roll having a line of time indicia lengthwise thereof along its surface to cooperate with said distance graduations and a speed marking for indicating the line of time indicia exposable through said window.

2. A plotting device as in claim 1 wherein said roll has a plurality of speed markings circumferentially about said roll with a line of time indicia extending lengthwise of the roll from each of said speed markings.

3. A plotting device as in claim 1 wherein said arcuate body portion has a window extending lengthwise of the body exposing the line of time indicia.

4. A plotting device as in claim 1 wherein said arcuate portion is spaced from said straight edge providing a flange along said straight edge.

5. A plotting device as in claim 1 wherein said arcuate portion is spaced from said straight edge providing a flange along said straight edge, a current arm having a fixed pivot on said flange, a course arm having one end slidable parallel to said straight edge and slidable relative to said current arm to lay out the angular effect that current may have on an intended course.

6. A plotting device as in claim 5 wherein a slidable connection of said arms is incorporated by means of a slot in one part and a pin connection thereto.

7. A plotting device as in claim 5 wherein there is a flange on each side of said arcuate body and a current and course arm is on each flange.

* * * * *